(12) United States Patent
Vogman

(10) Patent No.: US 8,680,821 B2
(45) Date of Patent: Mar. 25, 2014

(54) LOAD ADAPTIVE VOLTAGE REGULATOR

(75) Inventor: Viktor D. Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 12/975,909

(22) Filed: Dec. 22, 2010

(65) Prior Publication Data

US 2012/0161740 A1   Jun. 28, 2012

(51) Int. Cl.
   *G05F 1/00* (2006.01)

(52) U.S. Cl.
   USPC .......................................... 323/222; 323/271

(58) Field of Classification Search
   USPC ......... 323/222, 224, 225, 266, 267, 268, 271,
               323/282, 284, 285, 286, 288, 290
   See application file for complete search history.

(56) References Cited

U.S. PATENT DOCUMENTS

| | | | |
|---|---|---|---|
| 5,912,552 A | | 6/1999 | Tateishi |
| 6,037,754 A | * | 3/2000 | Harper .......................... 323/222 |
| 6,157,182 A | * | 12/2000 | Tanaka et al. .................. 323/284 |
| 6,188,206 B1 | | 2/2001 | Nguyen et al. |
| 6,215,288 B1 | * | 4/2001 | Ramsey et al. ............... 323/224 |
| 6,215,290 B1 | * | 4/2001 | Yang et al. ..................... 323/282 |
| 6,304,066 B1 | * | 10/2001 | Wilcox et al. ................. 323/282 |
| 7,245,113 B2 | | 7/2007 | Chen et al. |
| 2007/0080671 A1 | | 4/2007 | Qahouq et al. |
| 2008/0061759 A1 | * | 3/2008 | Lin et al. ........................ 323/290 |
| 2008/0218142 A1 | * | 9/2008 | Uehara .......................... 323/282 |
| 2008/0252277 A1 | * | 10/2008 | Sase et al. ..................... 323/283 |
| 2009/0001952 A1 | * | 1/2009 | Chang et al. .................. 323/280 |
| 2010/0026256 A1 | * | 2/2010 | Liu et al. ........................ 323/282 |
| 2010/0117616 A1 | * | 5/2010 | Qahouq et al. ................ 323/283 |
| 2010/0141225 A1 | * | 6/2010 | Isham et al. ................... 323/282 |
| 2011/0018507 A1 | * | 1/2011 | McCloy-Stevens et al. .. 323/271 |
| 2011/0050192 A1 | * | 3/2011 | Chiu et al. ..................... 323/284 |
| 2011/0089915 A1 | * | 4/2011 | Qiu et al. ....................... 323/271 |
| 2011/0316508 A1 | * | 12/2011 | Cheng et al. .................. 323/282 |

FOREIGN PATENT DOCUMENTS

| | | |
|---|---|---|
| WO | 2012/087609 A2 | 6/2012 |
| WO | 2012/087609 A3 | 10/2012 |

OTHER PUBLICATIONS

International Search Report and Written Opinion received for PCT application No. PCT/US2011/064119, mailed on Aug. 22, 2012, 9 Pages.
International Preliminary Report on Patentability received for PCT Patent Application No. PCT/US2011/064119, mailed on Jul. 4, 2013, 6 pages.

* cited by examiner

*Primary Examiner* — Timothy J Dole
*Assistant Examiner* — Yusef Ahmed
(74) *Attorney, Agent, or Firm* — Jordan IP Law, LLC

(57) ABSTRACT

Methods and systems may involve detecting an output voltage of a voltage regulator and sensing an inductor current corresponding to a saturating output inductor of the voltage regulator. A switching frequency signal can be generated based on the inductor current, wherein the voltage regulator may be controlled based on the output voltage and the switching frequency signal. In one example, the switching frequency signal sets a first switching frequency if the inductor current is below a saturation current threshold, and sets a second switching frequency if the inductor current is above the saturation current threshold, wherein the second switching frequency is less than the first switching frequency.

16 Claims, 3 Drawing Sheets

LOAD ADAPTIVE VOLTAGE REGULATOR

BACKGROUND

1. Technical Field

Embodiments generally relate to voltage regulators. In particular, embodiments relate to load adaptive voltage regulators.

2. Discussion

Conventional load adaptive voltage regulator ("VR") technologies may use a multi-phase topology to configure the voltage regulator into a lower power state in order to reduce its fixed losses. In particular, when the load on the voltage regulator is light, a control circuit might shed one or more phases, which may configure the voltage regulator for better efficiency at the lighter loads. While this approach may be suitable under certain circumstances, there remains considerable room for improvement. For example, the deployment of multiple phases may be economically ineffective. Moreover, phase shedding can have a limited bandwidth, which may result a drop in efficiency when the load current varies significantly.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for an apparatus including a single-phase regulator that generates an output voltage based on an input voltage. The apparatus can also include a control loop to detect the output voltage and control the voltage regulator based on the output voltage and a switching frequency signal. In addition, the apparatus may include a switching frequency controller to determine an inductor current of the voltage regulator and set the switching frequency based on the inductor current. In one example, the inductor current corresponds to a saturating output inductor of the voltage regulator.

Embodiments may also include a system having a processor core, and a single-phase voltage regulator coupled to the processor core or dual in-line memory module (DIMM), wherein the voltage regulator generates an output voltage based on an input voltage and applies the output voltage to the processor core or the memory module. Additionally, the system can include a control loop to detect the output voltage and control the voltage regulator based on the output voltage and a switching frequency signal. A frequency controller may determine an inductor current of the voltage regulator and set the switching frequency based on the inductor current.

Other embodiments may involve a method in which an output voltage of a single-phase voltage regulator is detected. The method can also provide for sensing an inductor current corresponding to a saturating output inductor of the single-phase voltage regulator, and generating a switching frequency signal based on the inductor current. The voltage regulator may be controlled based on the output voltage and the switching frequency signal. The switching frequency signal can set a first switching frequency if the inductor current is below a saturation current threshold and a second switching frequency if the inductor current is above the saturation current threshold. In one example, the first switching frequency is less than the second switching frequency.

Figure 1:
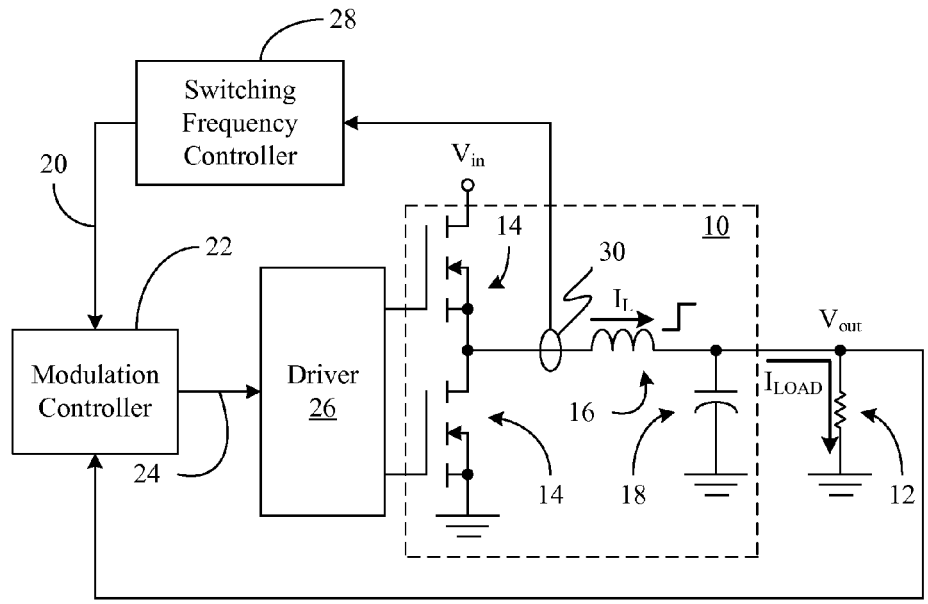
FIG. 1 is a schematic diagram of an example of a load adaptive voltage regulator architecture according to an embodiment.

FIG. 1 shows an apparatus having a single-phase voltage regulator 10 that generates an output voltage ("$V_{out}$") based on an input voltage ("$V_{in}$") and applies the output voltage to a load modeled as a resistor 12. The illustrated voltage regulator 10 is a step down DC-to-DC (e.g., Buck) converter having two switches (e.g., metal oxide semiconductor field effect transistors/MOSFETs) 14 and an output filter with an output inductor 16 and an output capacitor 18 coupled to the output inductor. As will be discussed in greater detail below, the output inductor 16 may be a saturating (e.g., non-linear) inductor that exhibits a significant (e.g., order of magnitude) drop in inductance when the magnetizing force is large enough to make the core of the output inductor 16 saturate (i.e., significantly reduce its magnetic permeability).

The illustrated apparatus also includes a control loop that generally detects the output voltage and controls the voltage regulator 10 based on the output voltage and a switching frequency signal 20. In particular, the control loop may include a modulation controller 22 that generates a pulse width modulated (PWM) signal 24 based on the output voltage and the switching frequency signal 20, and a driver 26 that controls the switches 14 based on the PWM signal 24.

The apparatus may also include a frequency controller 28 that uses a current sensor 30 to determine the amount of current flowing through the output inductor 16 (e.g., $I_L$, "inductor current") and generate the switching frequency signal 20 based on the inductor current. In particular, the illustrated current sensor 30 is coupled to a current path between the plurality of switches 14 and the output inductor 16, wherein the frequency controller 28 is able to determine the inductor current based on one or more readings from the current sensor 30. The voltage conversion ratio between $V_{in}$ and $V_{out}$ may be established based on the duty cycle of the PWM signal 24.

Figure 2:
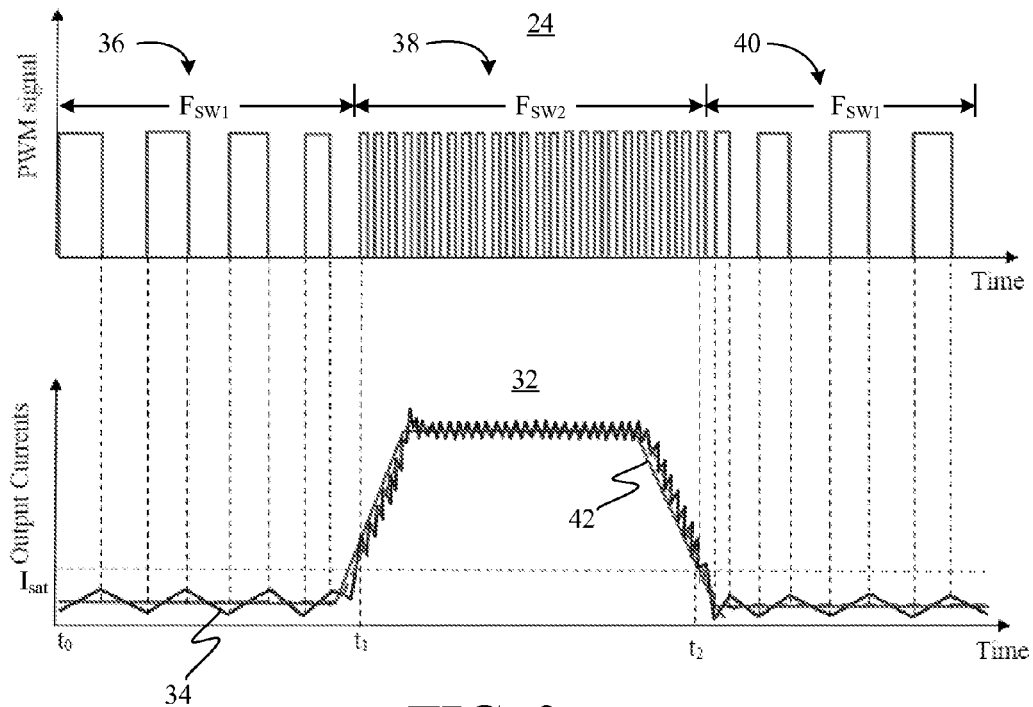
FIG. 2 are plots of examples of a switching frequency signal and corresponding output current curves according to an embodiment.

With continuing reference to FIGS. 1 and 2, an example of a PWM signal 24 and corresponding set of output current plots 32 are shown. Generally, the switching frequency signal 20 from the frequency controller 28 sets a first switching frequency ($F_{SW1}$) if the inductor current 34 reflects a light current load, wherein the inductor current 34 may follow the load current ("$I_{LOAD}$") 42 with a slight delay. In one example, the light current load corresponds to the inductor current 34 being below a current threshold such as, for example, the saturation current threshold ("$I_{sat}$") of the output inductor 16. Thus, the illustrated switching frequency signal 20 instructs the modulation controller 22 to oscillate the PWM signal 24 at frequency $F_{SW1}$ during time interval 36 from $t_0$ to $t_1$. The relatively low switching frequency $F_{SW1}$ can provide substantial efficiency improvements under light load conditions due to a corresponding reduction in switching losses.

If, on the other hand, the inductor current 34 reflects a heavy current load (e.g., inductor current is above the current threshold), the switching frequency signal 20 sets a faster second switching frequency ($F_{SW2}$). Accordingly, the switching frequency signal 20 may instruct the modulation controller 22 to oscillate the PWM signal 24 at frequency $F_{SW2}$ during time interval 38 from $t_1$ to $t_2$. Similarly, during time interval 40 after $t_2$, the switching frequency signal 20 may instruct the modulation controller 22 to oscillate the PWM signal 24 at the slower frequency $F_{SW1}$ again due to the inductor current 34 falling below the current threshold.

Figure 3:
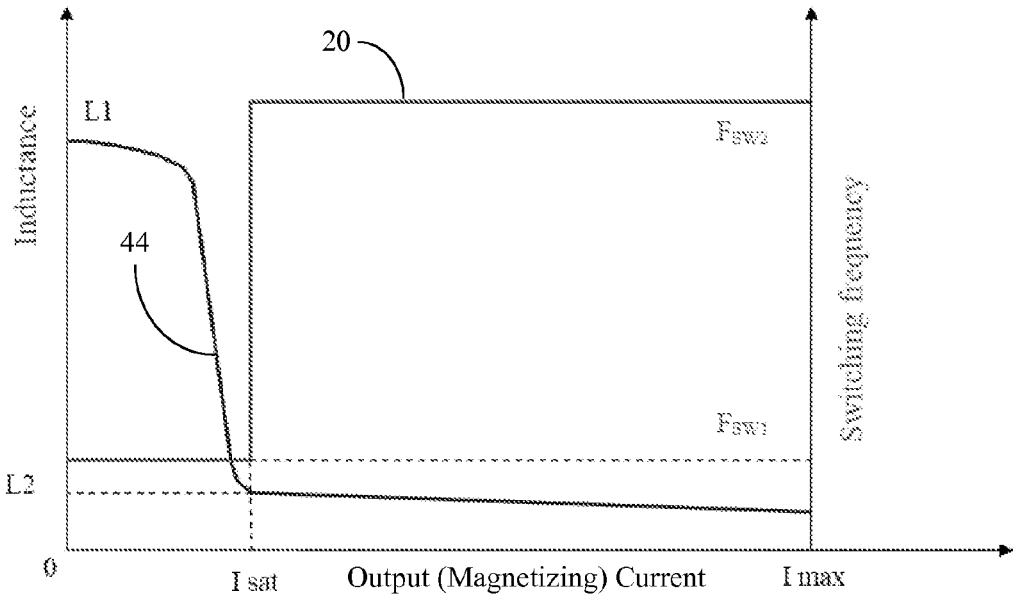
FIG. 3 are plots of examples of switching frequency and inductance vs. output (magnetizing) current curves according to an embodiment.

Turning now to FIG. 3, it has been determined that when the core of an inductor saturates, the inductance level 44 of the inductor can decrease by an order of magnitude (e.g., from $L_1$ to $L_2$). Upon detecting such a condition, the illustrated frequency controller 28 (FIG. 1) transitions the switching frequency signal 20 from frequency $F_{SW1}$ to $F_{SW2}$. The increase in switching frequency can enable the current ripple to remain substantially the same (e.g., substantially equivalent/equal). Indeed, if the switching frequency is increased by the same or greater factor (e.g., the ratio of $F_{SW2}$ to $F_{SW1}$ is greater than the ratio of $L_1$ to $L_2$), the current ripple may even decrease. Moreover, as already noted, operating at a low switching frequency during light loads and low current ripple magnitudes can enable significant efficiency improvements due to a corresponding reduction in switching losses (while equivalent series resistance power losses in the output capacitor remain unchanged).

Figure 4:
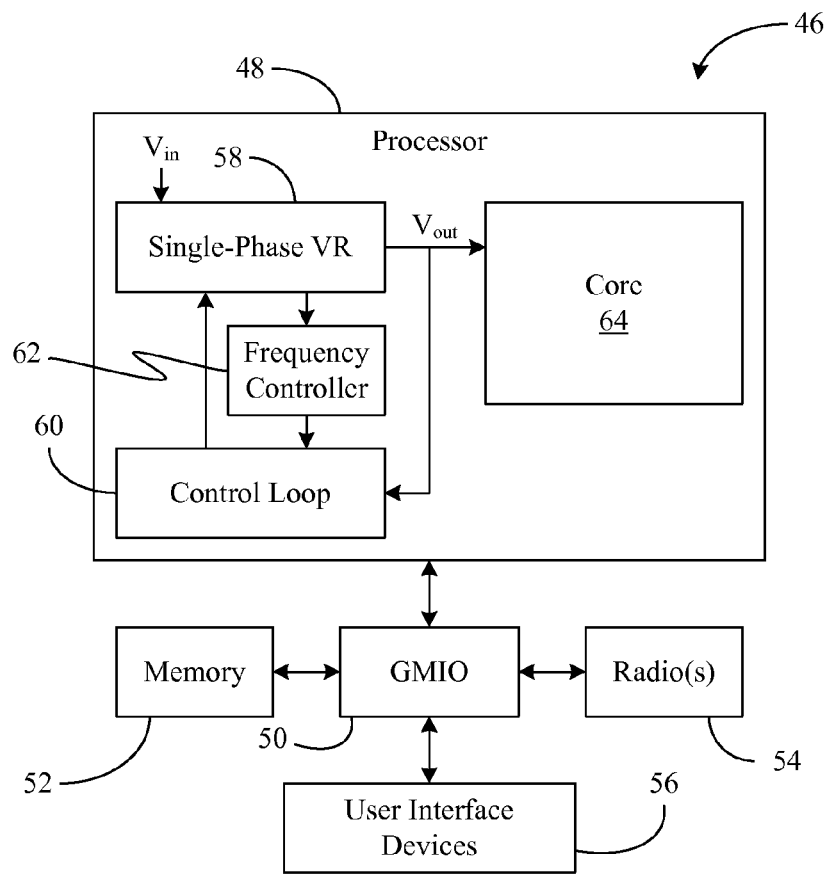
FIG. 4 is a block diagram of an example of a system according to an embodiment.

FIG. 4 shows a system 46 that may be a portion of a computing platform such as, for example, a desktop personal computer (PC), server, test system, design/debug tool, laptop, personal digital assistant (PDA), mobile Internet device (MID), wireless smart phone, tablet, media player, imaging device, or any combination thereof. The illustrated system 46 includes one or more processors 48, a graphics/memory/input/output (GMIO) control 50, memory 52, a wireless interface/radio 54, and user interface devices 56. The illustrated processor 48 functions as a host processor that includes a single-phase voltage regulator 58, a control loop 60, a frequency controller 62, and a processor core 64. The processor 64 could also have a multi-core configuration. In one example, the processor 64 is a high performance processor that has a low application utilization rate and can operate in various low power states. Accordingly, the core 64 may often encounter light load conditions. A DC input voltage signal/level/potential $V_{in}$ might be obtained from a battery (not shown) or other rail source that is not directly usable by the processor core 64. Thus, the regulator 58 may convert the input voltage signal into a DC output voltage signal level/potential $V_{out}$, which the processor core 64 can use during operation to perform various computing tasks.

The control loop 60 may include a driver 26 (FIG. 1) and a modulation controller 22 (FIG. 1) to generate a PWM modulated signal based on the output voltage and a switching frequency signal from the frequency controller 62, wherein the driver controls a plurality of switches 14 (FIG. 1) in the voltage regulator 58, as already discussed. As a result, the frequency controller 62 can enable the voltage regulator 58 to dynamically adapt to load current fluctuations that place an output inductor of the voltage regulator into and out of saturation, and in turn provide greater efficiency without having a negative impact on cost.

The processor 48 may be coupled to the memory 52, radios 54, and user interface devices 56 through the GMIO control 50. The GMIO control 50 may include one or more blocks (e.g., chips or units within an integrated circuit) to perform various interface control functions (e.g., memory control, graphics control, I/O interface control, and the like). These circuits may be implemented on one or more separate chips and/or may be partially or wholly implemented within the processor 48.

The memory 52 can include one or more memory blocks to provide additional storage to the processor 48, and may be implemented with any suitable memory including, but not limited to dynamic RAM (DRAM), static RAM (SRAM), flash memory, or the like. The radios 54 may wirelessly couple the processor 48 to a wireless network (not shown). The user interface devices 56 may include one or more devices such as a display, keypad, mouse, etc. to allow a user to interact with and perceive information from the system 46. The GMIO control 50, memory 52, radios 54 and/or user interface devices 56 may also include one or more load adaptive voltage regulators 58, frequency controllers 62, and control loops 60 to achieve a load adaptive voltage regulator architecture, as already discussed. Indeed, the illustrated mode of operation may also be combined with existing phase shedding technology for further light load efficiency improvements when the number of phases is limited (e.g., two to four phases) to save cost.

As already noted, the system 46 may implement a variety of different computing devices or other appliances with computing capability. Such devices include but are not limited to test systems, design/debug tools, laptop computers, notebook computers, PDAs, cellular phones, mobile Internet devices (MIDs), tablets, audio and/or video media players, desktop computers, servers, and the like. The system 46 could constitute one or more complete computing systems or alternatively, it could constitute one or more components useful within a computing system.

Figure 5:
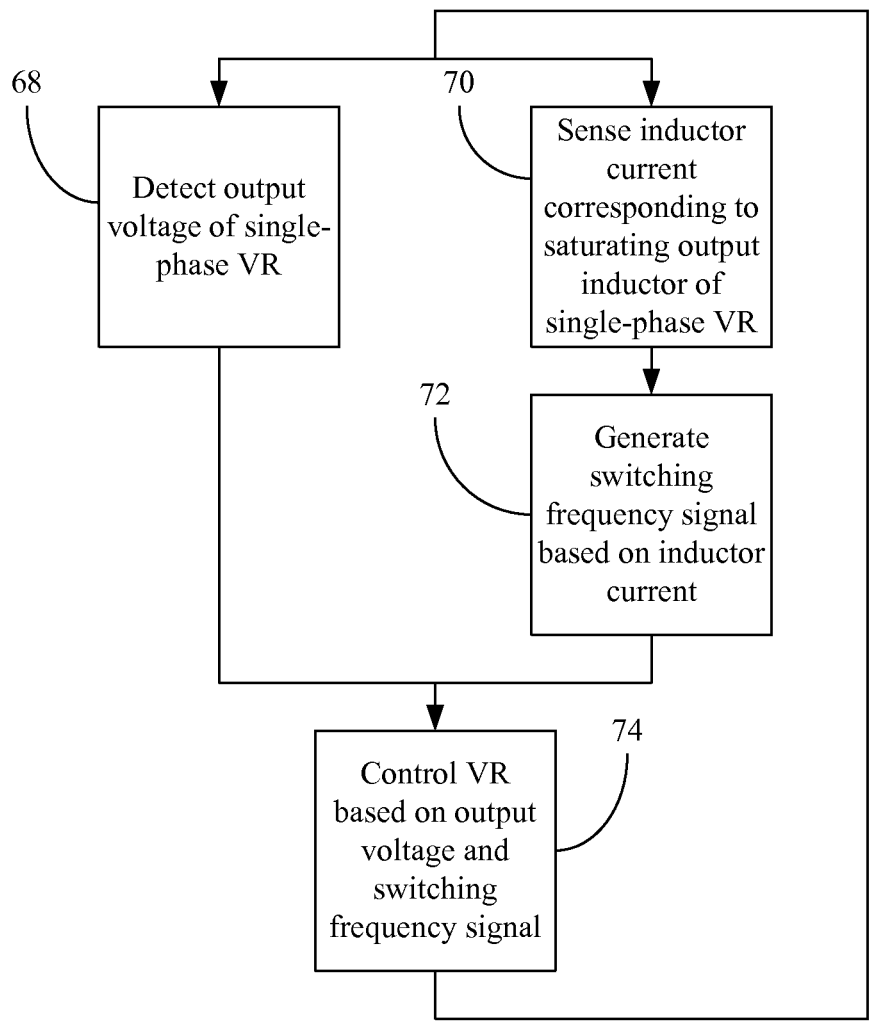
FIG. 5 is a flowchart of an example of a method of operating a voltage regulator according to an embodiment.

FIG. 5 shows a method 66 of operating a voltage regulator. The method 66 may be implemented in fixed-functionality hardware using circuit technology such as, for example, application specific integrated circuit (ASIC), complementary metal oxide semiconductor (CMOS) or transistor-transistor logic (TTL) technology, or any combination or variation thereof. Processing block 68 provides for detecting an output voltage of a single-phase voltage regulator, and processing block 70 provides for sensing an inductor current corresponding to a saturating output inductor of the single-phase voltage regulator. A switching frequency signal may be generated at block 72 based on the inductor current. As already noted, the switching frequency signal can set a first switching frequency if the inductor current is below a saturation current threshold, and a second switching frequency if the inductor current is above the saturation current threshold. Moreover, the first switching frequency may be less than the switching frequency in order to increase efficiency at lighter loads. Illustrated block 74 controls the voltage regulator based on the output voltage and the switching frequency signal.

The above-described techniques of using a saturating inductor and a PWM-based switching frequency controller can therefore enable a substantial reduction of switching losses reduction during light load conditions without a need of multi-phase arrangement. The techniques can also enable the construction of VRs at lower cost.

Embodiments described herein are applicable for use with all types of semiconductor integrated circuit ("IC") chips. Examples of these IC chips include but are not limited to processors, controllers, chipset components, programmable logic arrays (PLA)s, memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method comprising:
   detecting an output voltage of a single-phase voltage regulator;
   sensing an inductor current corresponding to a saturating output inductor of the single-phase voltage regulator;
   generating a switching frequency signal based on the inductor current; and
   controlling the voltage regulator based on the output voltage and the switching frequency signal, wherein the switching frequency signal sets a first switching frequency if the inductor current is below a saturation current threshold and a second switching frequency if the inductor current is above the saturation current threshold, and wherein the first switching frequency is less than the second switching frequency.

2. The method of claim 1, wherein the first switching frequency corresponds to a first inductance level of the saturating output inductor, and the second switching frequency corresponds to a second inductance level of the saturating output inductor, and wherein a ratio of the second switching frequency to the first switching frequency is greater than a ratio of the first inductance level to the second inductance level.

3. The method of claim 2, wherein the voltage regulator has a current ripple at the first switching frequency that is substantially equal to a current ripple at the second switching frequency.

4. The method of claim 1, further including:
   generating a pulse width modulated signal based on the output voltage and the switching frequency signal; and
   controlling a plurality of switches in the voltage regulator based on the pulse width modulated signal.

5. An apparatus comprising:
   a single-phase voltage regulator to generate an output voltage based on an input voltage;
   a control loop to detect the output voltage and control the voltage regulator based on the output voltage and a switching frequency signal; and
   a frequency controller to determine an inductor current of the voltage regulator and generate the switching frequency signal based on the inductor current, wherein the switching frequency signal is to set a first switching frequency if the inductor current is below a saturation current threshold and a second switching frequency if the inductor current is above the saturation current threshold, and wherein the first switching frequency is to be less than the second switching frequency.

6. The apparatus of claim 5, wherein the first switching frequency is to correspond to a first inductance level of an output inductor of the voltage regulator, and the second switching frequency is to correspond to a second inductance level of the output inductor, and wherein a ratio of the second switching frequency to the first switching frequency is to be greater than a ratio of the first inductance level to the second inductance level.

7. The apparatus of claim 6, wherein the voltage regulator is to have a current ripple at the first switching frequency that is substantially equal to a current ripple at the second switching frequency.

8. The apparatus of claim 5, wherein the voltage regulator includes:
   a plurality of switches;
   an output filter coupled to the plurality of switches; and
   a current sensor coupled to a current path between the plurality of switches and the current sensor, wherein the output filter includes an output inductor and an output capacitor, and wherein the inductor current is to correspond to the output inductor.

9. The apparatus of claim 8, wherein the output inductor includes a saturating output inductor.

10. The apparatus of claim 5, wherein the control loop includes:
    a modulation controller to generate a pulse width modulated signal based on the output voltage and the switching frequency signal; and
    a driver to control a plurality of switches in the voltage regulator based on the pulse width modulated signal.

11. A system comprising:
    a processor core;
    a single-phase voltage regulator coupled to the processor core, the voltage regulator to generate an output voltage based on an input voltage, and apply the output voltage to the processor core;
    a control loop to detect the output voltage and control the voltage regulator based on the output voltage and a switching frequency signal; and a frequency controller to determine an inductor current of the voltage regulator and generate the switching frequency signal based on the inductor current, wherein the switching frequency signal is to set a first switching frequency if the inductor current is below a saturation current threshold and a second switching frequency if the inductor current is above the saturation current threshold, and wherein the first switching frequency is to be less than the second switching frequency.

12. The system of claim 11, wherein the first switching frequency is to correspond to a first inductance level of an output inductor of the voltage regulator, and the second switching frequency is to correspond to a second inductance level of the output inductor, and wherein a ratio of the second switching frequency to the first switching frequency is to be greater than a ratio of the first inductance level to the second inductance level.

13. The system of claim 12, wherein the voltage regulator is to have a current ripple at the first switching frequency that is substantially equal to a current ripple at the second switching frequency.

14. The system of claim 11, wherein the voltage regulator includes:
a plurality of switches;
an output filter coupled to the plurality of switches; and
a current sensor coupled to a current path between the plurality of switches and the current sensor, wherein the output filter includes an output inductor and an output capacitor, and wherein the inductor current is to correspond to the output inductor.

15. The system of claim 14, wherein the output inductor includes a saturating output inductor.

16. The system of claim 11, wherein the control loop includes:
a modulation controller to generate a pulse width modulated signal based on the output voltage and the switching frequency signal; and
a driver to control a plurality of switches in the voltage regulator based on the pulse width modulated signal.

* * * * *